F. L. HORNING.
SUPPORT FOR PRESSURE RETAINING VALVES.
APPLICATION FILED MAR. 3, 1922.

1,431,662.

Patented Oct. 10, 1922.

Inventor
Fred L. Horning.

Sturtevant + Mason Attorneys

Patented Oct. 10, 1922.

1,431,662

UNITED STATES PATENT OFFICE.

FRED L. HORNING, OF SCHUYLKILL HAVEN, PENNSYLVANIA.

SUPPORT FOR PRESSURE-RETAINING VALVES.

Application filed March 3, 1922. Serial No. 540,767.

*To all whom it may concern:*

Be it known that I, FRED L. HORNING, a citizen of the United States, residing at Schuylkill Haven, in the county of Schuylkill, State of Pennsylvania, have invented certain new and useful Improvements in Supports for Pressure-Retaining Valves, of which the following is a description, reference being had to the accompanying drawing and to the figures of reference marked thereon.

This invention relates to supports, and more particularly to a bracket or support for a pressure retaining valve.

In railway practice the triple valve exhaust of the standard freight car brake cylinder and auxiliary reservoir combined is connected by means of a small length of pipe to the usual weight or spring type of pressure retaining valve. At the present time the pressure retaining valve is fastened to the car by bolts or wood screws which pass through perforations in ears or lugs integral with the valve. It is frequently necessary to remove these pressure retaining valves for repairs and replacements. Much difficulty has been encountered in the quick and facile removal of these valves as generally the bolts or screws have to be cut off and in many instances the valves have become broken in thus detaching them from the car.

The object of the present invention is to provide a simple, cheap device for firmly holding the pressure retaining valve in its connected position while permitting its ready removal and assembly.

Another object of this invention resides in the provision of a simple sheet metal support for the purpose set forth, which is constructed and arranged to effectively hold the valve in position on the car.

These and other objects will be apparent from a perusal of the following specification when taken in connection with the accompanying drawings, wherein—

Figure 1:
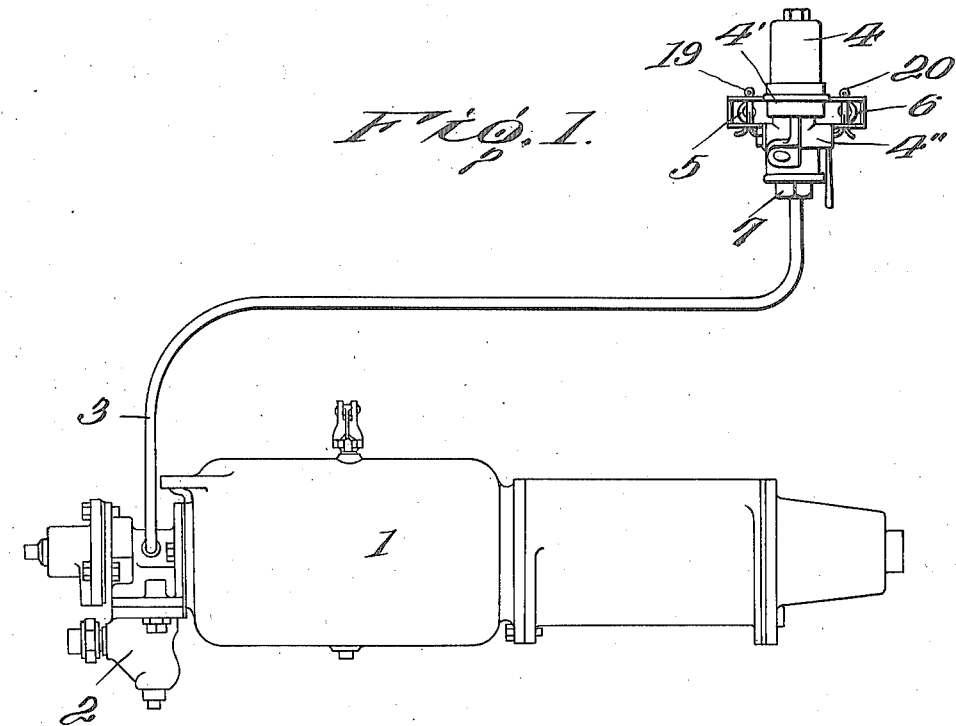
Figure 1 is an elevation of a standard freight car brake cylinder and auxiliary reservoir combined showing the triple valve and pipe connection to the pressure retaining valve illustrated as held by my improved supporting device.

Referring now to the drawings, in detail, the combined brake cylinder and auxiliary reservoir 1 is provided with the usual triple valve exhaust 2 having the customary three-eighths inch piping 3 connecting with the usual type of spring or weight operated pressure retaining valve 4, which, as is well known, is provided with the opposed ears or lugs 5 and 6 perforated to receive the customary fastening bolts or screws. In the standard practice this pressure retaining valve 4 is attached to the pipe 3 by means of a threaded connection and a fastening nut 7.

Heretofore these valves 4 have been attached to the car by means of bolts or screws passing through the perforations in the ears 5 and 6, but such a manner of fastening has proven exceedingly objectionable because it has been necessary in many instances to cut the bolts and screws in order to free the valve—particularly when the screws have become rusty or the threads worn. In many cases the valves have become broken in so removing them.

Figure 2:
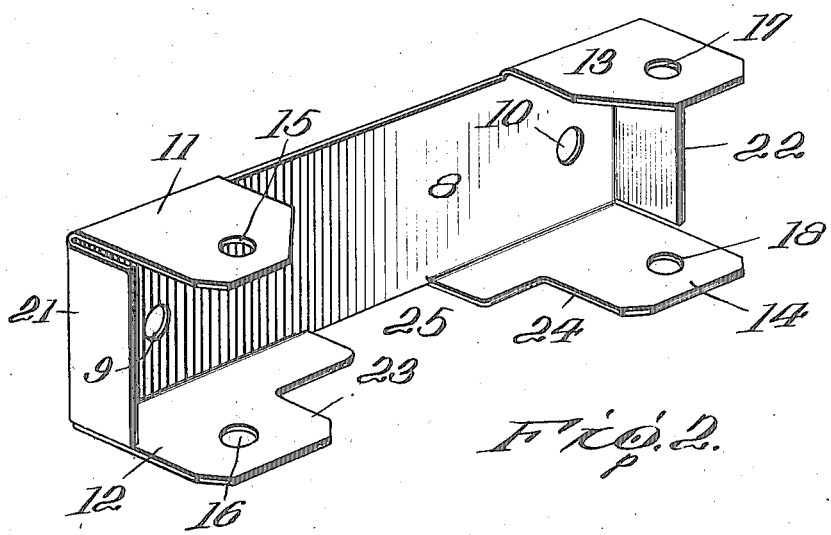
Fig. 2 is a perspective view of the supporting bracket.

In the present instance all these objections are overcome by a simple support for detachably holding the valve 4 in position on the car. The support comprises a single sheet metal piece formed or bent into the shape of a bracket or support. This sheet metal piece comprises a main portion 8 constituting a rear wall and suitably perforated, as at 9, for attachment to the car wall by screws or bolts. This main portion is provided with a plurality of integral flaps or extensions which in the preferred embodiment of the invention are cut to the form and folded, as is illustrated in Fig. 2. As there shown, each end of this main portion is provided with pairs of extensions 11, 12, 13 and 14 projecting laterally therefrom. In the finished device, these pairs of ears are bent upwardly at right angles to the main portion and are provided with registering holes 15, 16, 17 and 18 to receive fastening cotter pins 19 and 20. Preferably, each end of the main portion is likewise provided with an end flap 21 and 22 which fold between the pairs of ears, 11, 12, 13 and 14 to close the ends of the support. These end flaps are not essential, but are desired.

As clearly illustrated in Fig. 1, the lateral lugs 5 and 6 of the valve lie within the up-bent side flaps 11, 12, 13 and 14 and are held in such position by the cotter pins 19 and 20. In this position the large cylinder 4' of the valve projects across the central transverse axis of the main portion and the inner walls of the side flaps 11 and 13 are spaced apart therefrom to accommodate this increased size of the valve. So, also, the transverse axis 4'' of the valve projects between the flaps 12 and 14, the inner walls of which are cut, as illustrated, to conform to the contour of the valve at this point. As shown, each inner wall of the flaps 12 and 14 are provided with a shoulder 23 and 24 to form a seat 25 adapted to snugly hold the transverse axis 4'' of the valve from lateral play. This shoulder is also provided so that the same support will snugly retain either a spring type valve or a weight type valve in position, since these valves are of slightly different shape at this portion and are of slightly different diameter. With this construction when the valve is placed in position and the cotter pins 19 and 20 passed through the holes 15, 16, 17 and 18, the valve is securely locked in position and cannot rattle or become inadvertently displaced. The valve is quickly removed by taking out the cotter pins and is then unscrewed from the pipe.

It is manifest that the support is capable of many modifications in design according to the type of valve to be held and therefore the invention is not to be restricted to the exact details of construction except in so far as they are limited by the scope of the appended claims as interpreted by the prior art.

Having thus described the invention, what I claim as new and desire to secure by Letters Patent, is:

1. A sheet metal support for a pressure retaining valve comprising a main portion having means for attachment to a car, said main portion having integral flaps constructed and arranged to receive the perforated attaching ears of the valve therebetween, and means for holding said ears in such position.

2. A sheet metal support for a pressure retaining valve comprising a main portion adapted for attachment to a car, said main portion having pairs of flaps at each end adapted to receive the body of the valve therebetween, said pairs of flaps being spaced apart to receive the perforated attaching ears of the valve therebetween, said pairs of flaps having registering apertures, and cotter pins detachably passing therethrough to hold said valve in position.

3. A sheet metal support for a pressure retaining valve comprising a main portion suitably perforated for attachment to a car, said main portion having integral flaps at each end thereof spaced for the central transverse axis of the main portion to permit the passing of the valve body between said flaps, said pairs of flaps being spaced apart to receive the attaching ears of the valve therebetween, and provided with registering holes for the reception of cotter pins for detachably fastening said valve in said support.

In testimony whereof, I affix my signature.

FRED L. HORNING.